United States Patent
Ernandes et al.

(10) Patent No.: US 7,230,741 B2
(45) Date of Patent: Jun. 12, 2007

(54) OPTIMUM NON-UNIFORMITY CORRECTION FOR IMAGING SENSORS

(75) Inventors: Kenneth J Ernandes, Amityville, NY (US); Robert J Kleehammer, Huntington, NY (US)

(73) Assignee: BAE Systems Information and Electronic Systems Integration, Inc., Reconnaissance and Surveillance Systems, Greenlawn, NY (US)

( * ) Notice: Subject to any disclaimer, the term of this patent is extended or adjusted under 35 U.S.C. 154(b) by 1054 days.

(21) Appl. No.: 10/340,594

(22) Filed: Jan. 13, 2003

(65) Prior Publication Data

US 2007/0103742 A1 May 10, 2007

(51) Int. Cl.
*G06K 15/00* (2006.01)

(52) U.S. Cl. .................. 358/3.1; 358/509; 382/274

(58) Field of Classification Search ............... 358/3.1, 358/509, 3.26, 520; 382/274, 260, 263, 275
See application file for complete search history.

(56) References Cited

U.S. PATENT DOCUMENTS

| 5,532,827 | A | * | 7/1996 | Kajitani et al. | 358/3.1 |
| 5,710,876 | A | * | 1/1998 | Peercy et al. | 345/426 |
| 6,738,035 | B1 | * | 5/2004 | Fan | 345/87 |
| 2002/0186875 | A1 | * | 12/2002 | Burmer et al. | 382/133 |
| 2003/0076989 | A1 | * | 4/2003 | Maayah et al. | 382/145 |

* cited by examiner

*Primary Examiner*—Jerome Grant, II
(74) *Attorney, Agent, or Firm*—Sterne, Kessler, Goldstein & Fox P.L.L.C.

(57) ABSTRACT

The present invention relates to a method of generating intensity measurement correction coefficients for a pixel in a focal plane array of an optical sensor, wherein the correction coefficients are used to correct an intensity measurement generated by the pixel responsive to illumination. The method includes the steps of accessing past values of the correction coefficients, receiving a pixel intensity measurement indicative of illumination characterized by a reference energy density function, generating a modeled noise signal, and generating present values of the correction coefficients. The present values of the correction coefficients are generated based on the past values of the correction coefficients, the pixel intensity measurement, the modeled noise signal, and the reference energy density function.

26 Claims, 11 Drawing Sheets

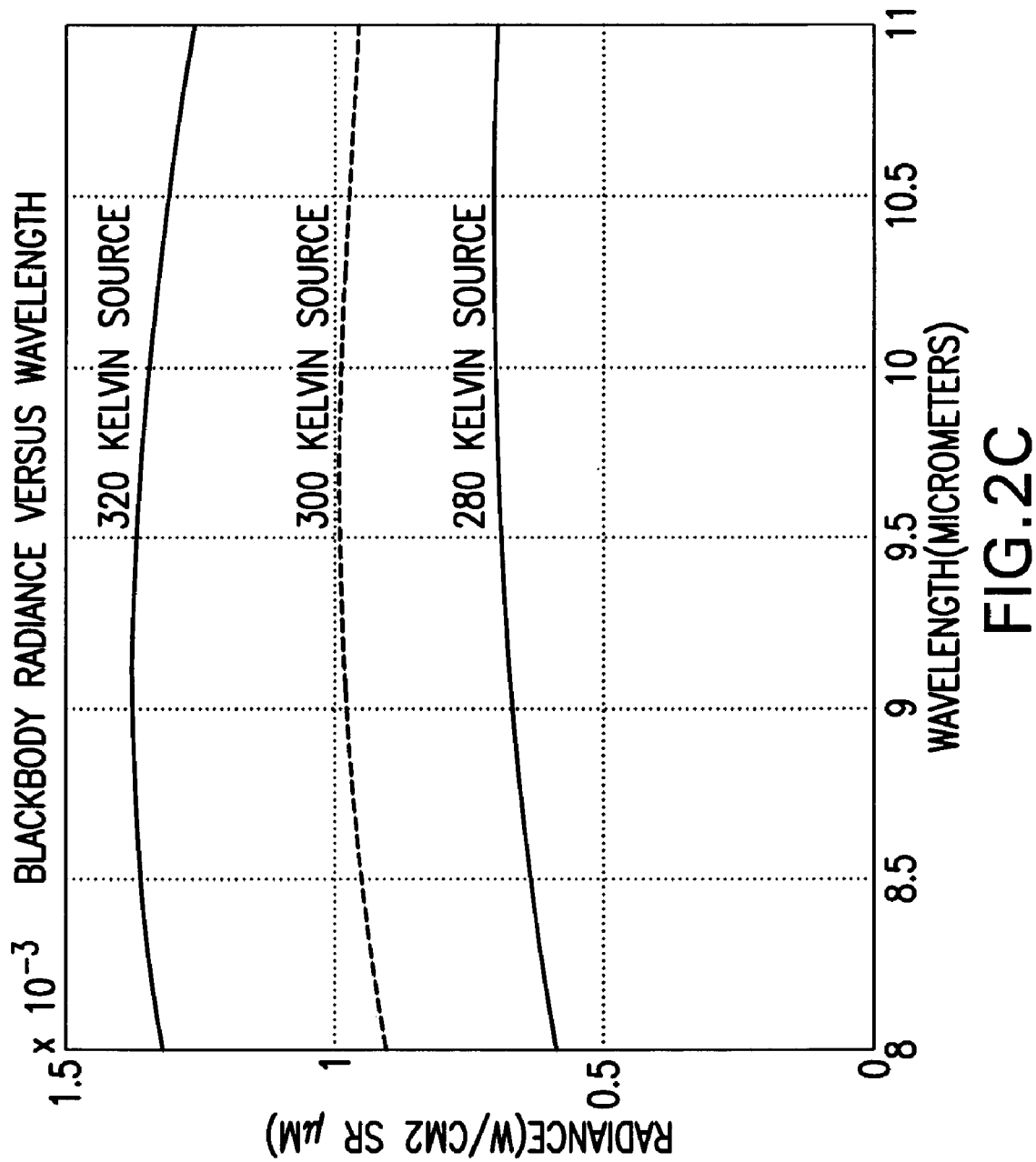

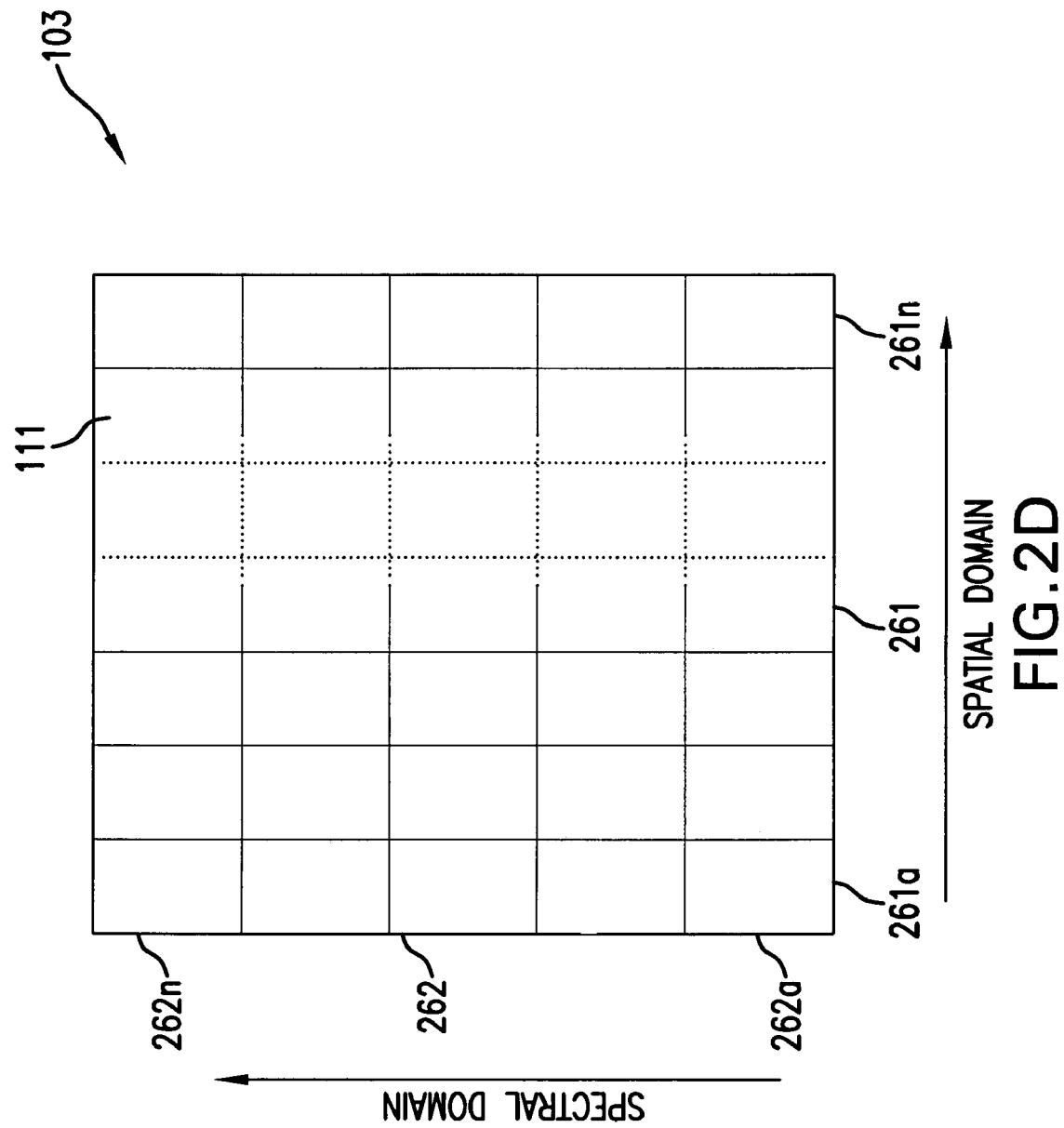

OPTIMUM NON-UNIFORMITY CORRECTION FOR IMAGING SENSORS

BACKGROUND OF THE INVENTION

1. Field of the Invention

The present invention relates to imaging sensors and, more specifically, to a method and system for calibrating such imaging sensors.

2. Background Art

Imaging sensors are used to detect illumination or radiation from scenes using focal plane arrays ("FPAs"), also referred to as FPA detectors. Focal plane arrays are composed of light sensitive elements, referred to herein as pixels. When illumination is incident upon such a light sensitive element, it generates an intensity measurement indicating the strength or level of illumination applied to the element.

In an example application, FPA detectors are designed as area spectrometers having a large number of light sensitive elements for receiving illumination. Once illumination is incident upon such an FPA detector, each of the light sensitive elements produces an intensity measurement. Because each light sensitive element tends to have a different response to illumination as compared to each of the other light sensitive elements, a non-uniform intensity response is generated across the FPA detector. This non-uniform intensity response reduces the utility of images produced by the FPA detector. Alternatively, the non-uniform intensity response tends to reduce the utility of light sensor by masking the features of the scene.

Therefore, it is desirable that a uniform intensity response be generated by the FPA detector so that a clearer image can be generated. Conventionally, there have been several methods to correct the intensity response across the FPA detector to make it more uniform. However, such methods produced inadequate results because of an operational variations in the response of the FPA detector to different illuminations. Furthermore, conventional methods generated short-term drift as well as long-term aging in the response of the FPA detector. Therefore, there is a need for an improved method of generating a uniform response of the FPA detector to illumination in operational sensors.

BRIEF SUMMARY OF THE INVENTION

The present invention relates to imaging sensors and, more specifically, to a method and system for calibrating such imaging sensors. The present invention relates to a new Kalman filter approach to a focal plane array ("FPA") detector non-uniformity correction ("NUC") using data captured from an operational imaging system. The present invention allows optimum correction of the FPA detector non-uniformity response to an external source of illumination as limited by FPA detector noise. The present invention applies to all sensor types and spectral regions. It is well suited to airborne and satellite sensors that require unattended and automatic calibration using on-board reference sources and illumination standards.

The present invention relates to a method of generating intensity measurement correction coefficients for a pixel in a focal plane array of an optical sensor, wherein the correction coefficients are then used to correct an intensity measurement generated by the pixel responsive to scene illumination. The method includes the steps of accessing past values of the correction coefficients, receiving a pixel intensity measurement from the pixel indicative of illumination characterized by a reference energy density function, generating a modeled noise signal, and generating present values of the correction coefficients. The present values of the correction coefficients are generated based on the past values of the correction coefficients, the pixel intensity measurement, the modeled noise signal, and the reference energy density function.

The present invention method allows for a robust process that works in the presence of considerable sensor drift (including 1/f noise), which is inherent in current FPA detectors. Furthermore, the present invention method does not require knowledge of the initial coefficients. It converges to the solution even if there is no initial estimate.

The present invention is a model noise based process that exploits the knowledge of sensor characteristics to refine the accuracy of the correction coefficients. The method produces correction results limited by the inherent temporal noise generated by the imaging system.

Finally, the present invention's method can be implemented progressively, as the FPA response data becomes available. The method does not depend on the type of detector or the physical method of generating non-uniformity correction to FPA response. It can be applied to any focal plane detector as well as spectral band such as x-ray, ultra-violet, visible, infrared and others.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 2c illustrates black body illumination curves for three temperatures over 7 μm to 12 μm wavelength range.

FIG. 2d illustrates an example focal plane array, according to the present invention.

FIG. 3b is a more detailed flow chart diagram of the method for generating non-uniformity correction coefficients shown in FIG. 3a.

The present invention is described with reference to the accompanying drawings. In the drawings, like reference numbers indicate identical or functionally similar elements.

DETAILED DESCRIPTION OF THE INVENTION

Table of Contents

1. Terminology.

2. Example System.

3. Non-Uniformity Correction Method for Imaging Sensors.

4. Non-Uniformity Correction Processor for Imaging Sensors.

5. Computer System.

6. Conclusion.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

1. Terminology.

To more clearly delineate the present invention, an effort is made throughout the specification to adhere to the following term definitions and term notations as consistently as possible.

Notation $x_k$ is a state of a system at a present or current time k. Thus, $x_k$ is referred to as a $k^{th}$ state. Similarly, $x_{k-1}$ is a state of the system at a previous or past time k−1.

Notation $\hat{x}_k$ means an estimate for the state $x_k$ at the time k.

$P_{k|k}$—in the indices, the first index indicates the respective time k or k−1 at which the indexed variable (P) is or was calculated. The second index, separated from the first index by a straight line, indicates the time at which the values needed to calculate the respectively indexed variable were available. Therefore, notation $P_{k|k-1}$ means that values of $P_{k-1}$ were available and used to calculate value of $P_k$ at the time k. Notation $P_{k|k-1}$ is typically used in calculation of a covariance in a Kalman filter algorithm, which will be described later.

The terms "illumination" and "radiation" are used herein equivalently and interchangeably.

2. Example System.

Figure 1:
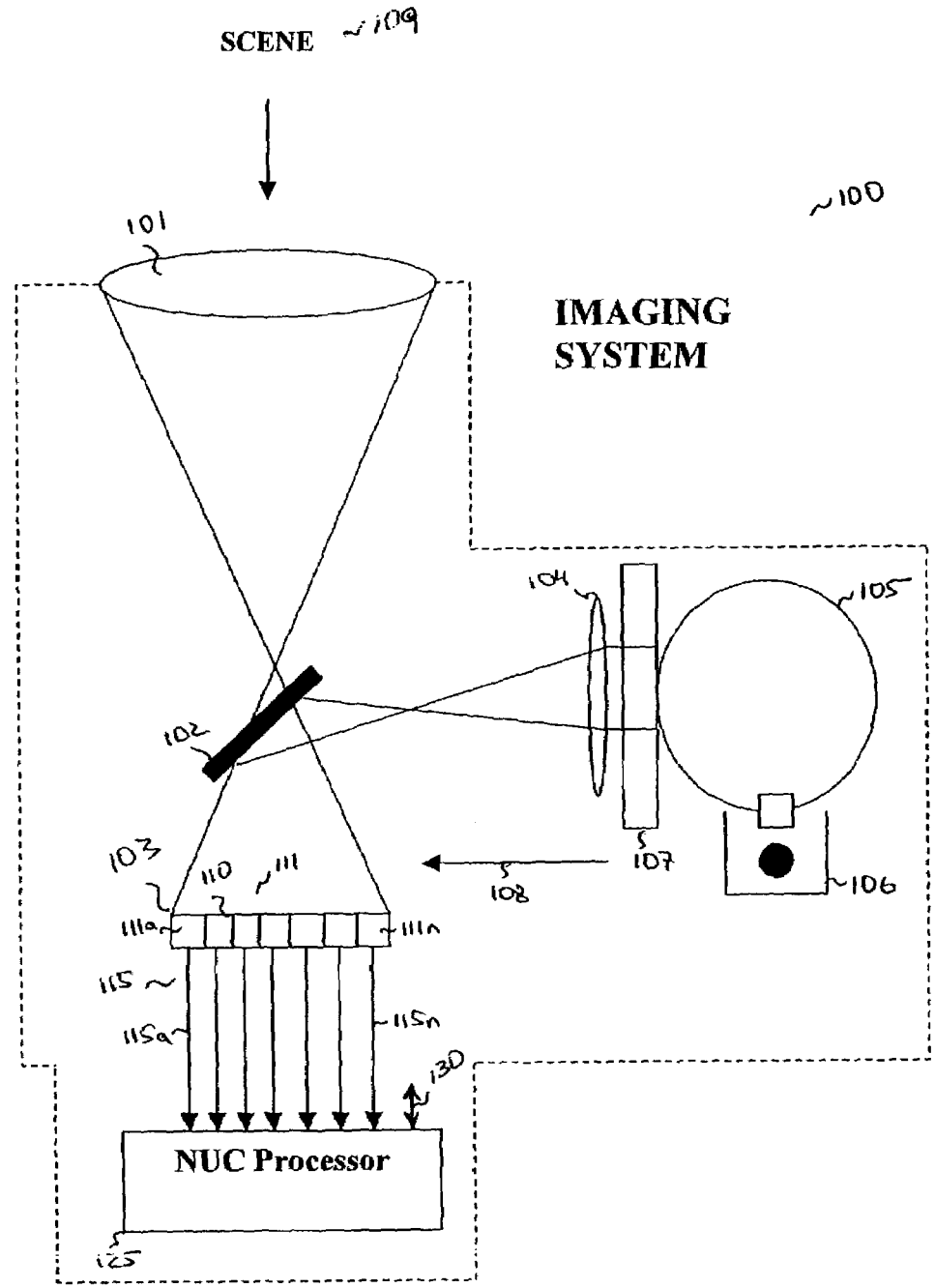
FIG. 1 illustrates an example system in which embodiments of the present invention can be implemented.

FIG. 1 is a block diagram of an example imaging system 100 in which the present invention can operate. System 100 receives scene illumination 109 from a distant external source (not shown in FIG. 1). A main objective lens 101, such as a telescope objective lens, directs scene illumination 109 to a rotatable switching mirror 102. System 100 also includes an internal reference illumination source 106 for generating reference illumination 108, which has a known or calibrated illumination characteristic. Source 106 can generate reference illumination 108 with any one of a plurality of different illumination characteristics. For example, source 106 may be a black body radiator controlled to emit reference illumination 108 at different temperatures of the black body radiator. Black body source 106 can be specific to long wave infrared sensors capable of operating in 2–14 μm. In alternative embodiments, non-blackbody sources can be used for sensors operating in visible, short wave infrared and other wave regions. System 100 includes an optical assembly with means to provide uniform illumination, which may include an integrating sphere 105, and calibration relay lenses 104 and 107, positioned between internal illumination source 106 and rotatable switching mirror 102. Calibration relay lenses 104 and 107 receive the uniform illumination from calibration integrating sphere 105 and direct it towards rotatable switching mirror 102 (as shown by arrow 108 in FIG. 1).

Rotatable switching mirror 102 rotates to a first position during a scene measurement cycle of system 100. In the first position, mirror 102 passes only scene illumination 109 to an illumination receiving face 110 of a focal plane array ("FPA") 103. Rotatable switching mirror 102 rotates to a second position during a calibration cycle of system 100. In the second position, rotatable switching mirror 102 passes only reference illumination 108 to receiving face 110 of FPA 103. Over time, rotatable switching mirror 102 alternately rotates between the first and second positions as system 100 correspondingly cycles between the scene measurement and calibration cycles. During successive calibration cycles, illumination source 106 generates reference illumination 108 with different characteristics. For example, source 106 may emit illumination 108, for example, black body radiation, at different black body temperatures (mentioned above) during the successive calibration cycles.

FPA 103 includes a plurality of light sensitive pixels 111a–111n (collectively, pixels 111) for alternately receiving illumination 109 and 108. Each of pixels 111 generates a respective illumination intensity measurement, such as a signal current, representative of an intensity of the illumination exposing the pixel. Thus, in FIG. 1, pixels 111a–111n generate respective pixel intensity measurements 115a–115n (collectively pixel intensity measurements 115). During the calibration cycle, illumination intensity measurements 115 represent reference or calibration illumination 108. During the scene measurement cycle, illumination intensity measurements 115 represent scene illumination 109.

System 100 also includes a NUC processor 125 coupled to FPA 103. NUC processor 125 receives pixel intensity measurements 115 during both scene measurement and calibration cycles, and processes the pixel intensity measurements according to the methods of the present invention. NUC processor 125 controls operation of imaging system 100 over a control interface 130, which may be coupled to reference illumination source 106, rotatable mirror 102, and FPA 103, for example.

Figure 2A:
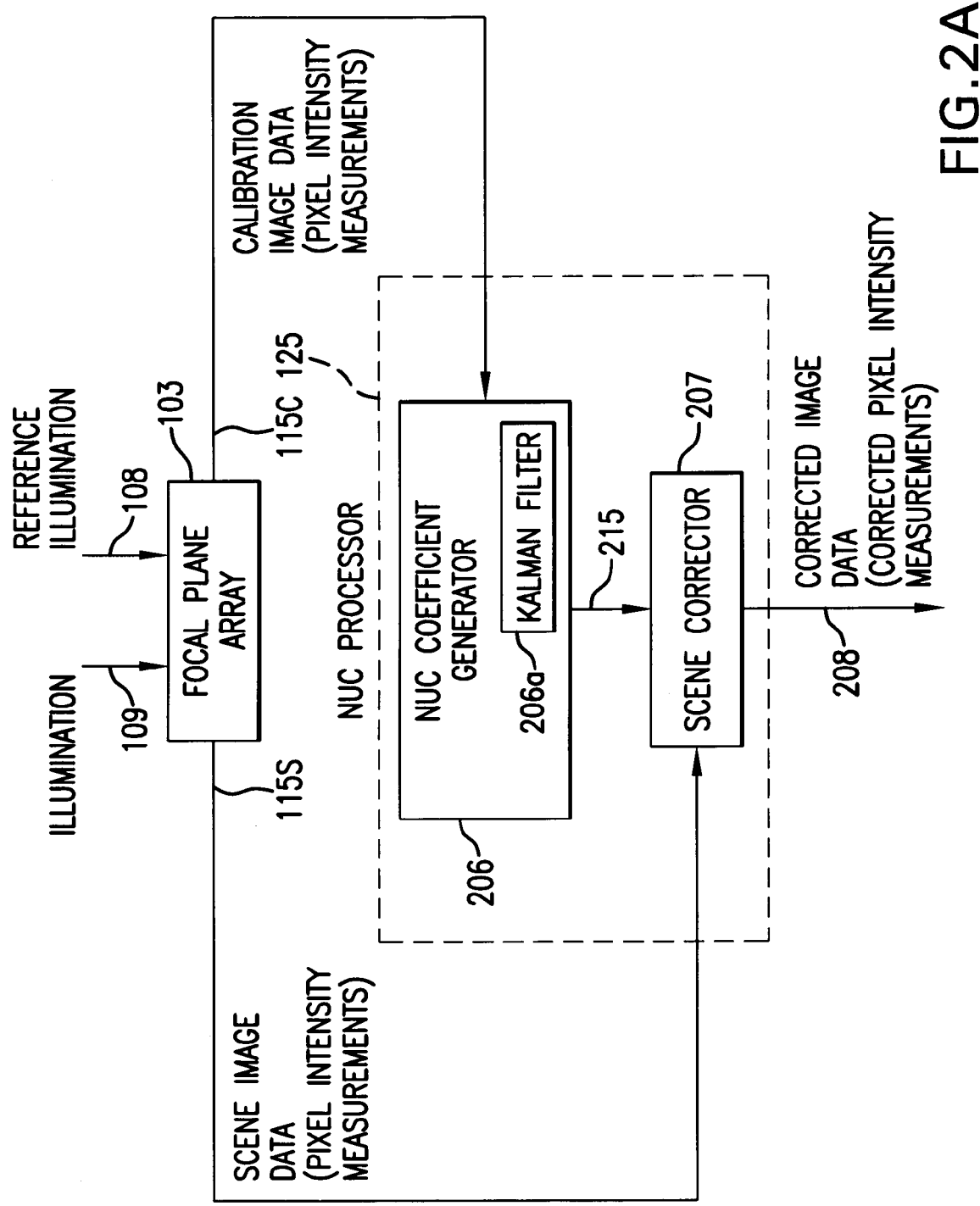
FIG. 2a is a block diagram expanding on portions of the system of FIG. 1.

FIG. 2a is a block diagram expanding on portions of system 100. In FIG. 2a, pixel intensity measurements 115 generated by FPA 103 during a scene measurement cycle are represented as pixel intensity measurements 115S (also referred to herein as scene image data 115S). Also, pixel intensity measurements 115 generated by FPA 103 during a calibration cycle are represented as pixel intensity measurements 115C (also referred to herein as calibration image data 115C). NUC processor 125 includes an NUC coefficient generator 206 coupled to a scene corrector 207. In an arrangement of the present invention, NUC coefficient generator 206 includes a Kalman filter 206a for performing Kalman filter processing in a manner to be described below.

During a calibration cycle, NUC coefficient generator 206 generates NUC coefficients 215 from pixel intensity measurements 115C in a manner described in detail below, and provides the NUC coefficients to scene corrector 207. During the calibration cycle, NUC coefficient generator 206 uses Kalman filter 206a in a calibration routine to generate NUC coefficients 215.

Then, during a subsequent scene measurement cycle, scene corrector 207 applies NUC coefficients 215 to pixel intensity measurements 115C to produce corrected pixel intensity measurements 208 (also referred to herein as corrected image data 208). In other words, scene corrector 207 corrects pixel intensity measurements 115S using NUC coefficients 215. Corrected pixel intensity measurements 208 include an individual corrected pixel intensity measurement corresponding to each pixel intensity measurement in pixel intensity measurements 115S. NUC coefficient generator 206 and scene corrector 207 repeatedly perform their respective functions over time as system 100 alternates between scene measurement and calibration cycles.

NUC coefficient generator 206 generates an individual set of NUC correction coefficients corresponding to each of pixels 111. That is, generator 206 generates N sets of NUC correction coefficients (collectively represented at 215 in FIG. 2a), one set corresponding to each pixel in FPA 103. The individual set of NUC correction coefficients for a given pixel characterize, and, thus, may be used to correct the intensity measurement produced by that pixel in response to illumination of the pixel. The individual set of NUC correction coefficients for the given pixel include an offset coefficient, O, and a gain coefficient, G.

The given pixel should produce a zero output in response to zero input illumination. The offset coefficient represents a deviation from this desired result. In other words, the offset coefficient represents an intensity measurement produced by the pixel, for example, a signal current level produced by the pixel, in the absence of illumination. The gain coefficient is directly proportional to (that is, linearly dependent on) the pixel intensity measurement.

Use of the NUC coefficients in the present invention is illustrated by the following example directed to a single pixel. Assume that during a calibration cycle, NUC generator 206 generates a set of NUC coefficients, that is, an offset, O, and gain, G, corresponding to pixel 111a. Also assume that during a subsequent scene measurement cycle, pixel 111a generates an intensity measurement 115a, denoted $I_{READ}$, in response to scene illumination, where $I_{READ}$ is referred to as a "raw" or uncorrected intensity measurement. Scene corrector 207 applies the NUC correction coefficients, G and O, to $I_{READ}$, to generate a corrected or calibrated intensity measurement, denoted $I_{CORR}$, among corrected intensity measurements 208, in accordance with the following relationship:

$$I_{READ} = (I_{CORR} - O)/G \quad (1)$$

Figure 2B:
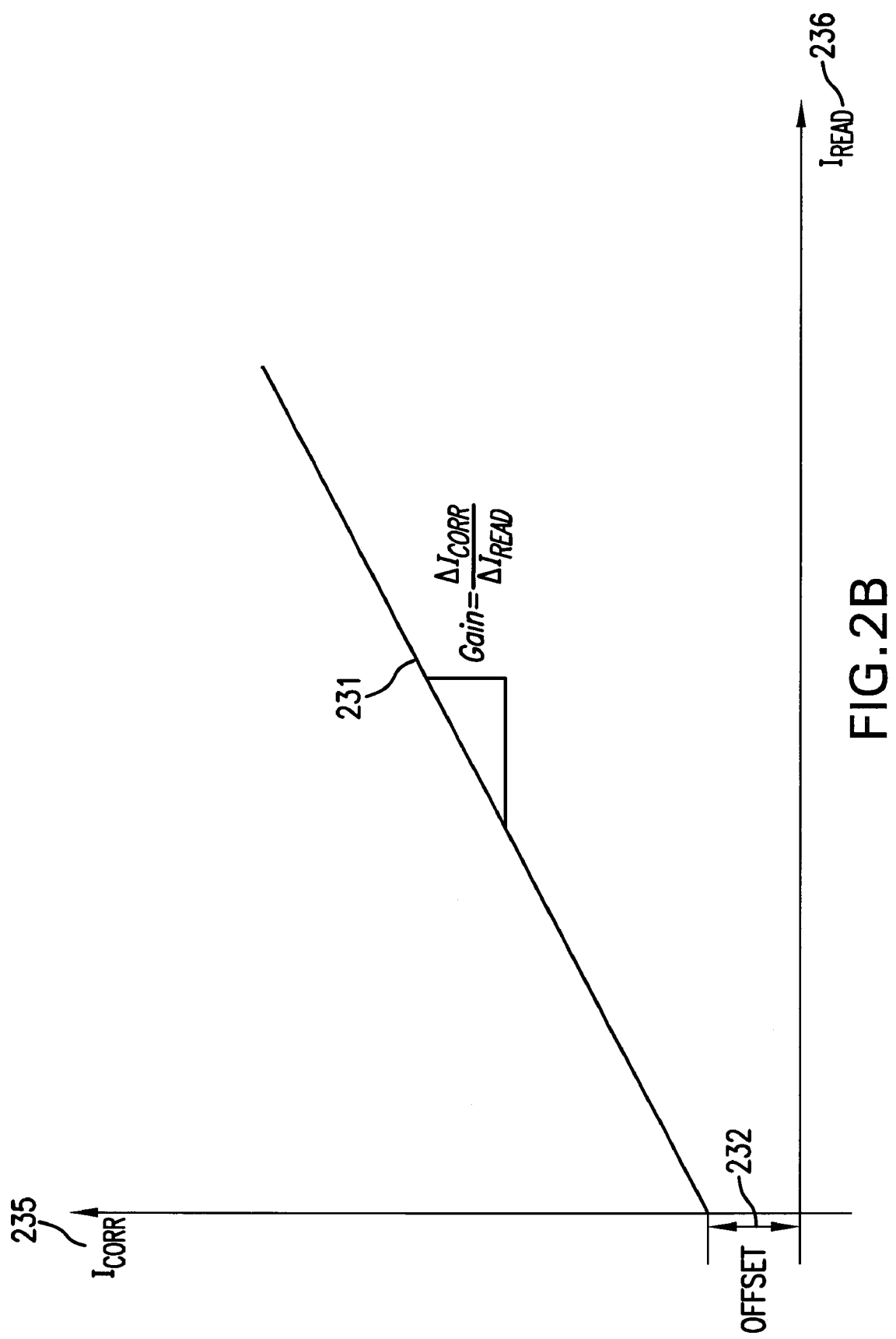
FIG. 2b is a graphical illustration of applying non-uniformity correction coefficients to a particular pixel within a focal plane array.

FIG. 2b is a graphical illustration of equation (1). Horizontal or X-axis 236 represents raw intensity measurement, $I_{READ}$, and vertical or Y-axis 235 represents its corrected version, $I_{CORR}$. Thus, line 231 represents $I_{CORR}$, where line 231 has a slope equal to gain, G. The offset, O, is represented by the Y-intercept 232.

In an embodiment of the present invention, imaging system 100 performs non-uniformity correction (NUC) using three black body sources, of calibration source 106, at nominal temperatures of 280 K, 300 K, and 320 K, as shown in FIG. 2c.

FIG. 2c illustrates black body illumination curves according to the three temperatures above over a 7 μm to 12 μm wavelength range. Based on these temperatures, a black body generating function provides a theoretical basis for modeling illumination intensity levels over a spectral or frequency range for a particular temperature and wavelength. The black body generating function is defined as follows:

$$N(\lambda, T) = \frac{2\pi hc^2}{\left[e^{\frac{hc}{\lambda kT}} - 1\right] * \lambda^5} \quad (2)$$

wherein $c = 2.99792458 \times 10^8$ m/sec (speed of light), $h = 6.626176 \times 10^{-34}$ J-s (Planck's constant), $k = 1.380662 \times 10^{-23}$ J/K (Boltzmann's constant), T is temperature measured in Kelvins (K), and λ is wavelength measured in meters (m).

The black body function $N(\lambda, T)$ is defined in units of $[J/s-m^2]$.

FIG. 2d illustrates an embodiment of FPA 103. In this embodiment, FPA 103 has dimensions of 512×186 pixels configured for use as an area spectrometer. Therefore, FPA 103 collects 512 spectrums 261 in 186 bins 262. The spatial domain of FPA 103 is defined by the 512 spectrums 261 and the spectral domain is defined by the 186 bins 262. In this embodiment, the 186 pixel spectral domain covers the wavelengths from 7.95 μm to 11.05 μm. The NUC of the present invention determines uniform spatial and spectral response of FPA 103 to uniform illumination of FPA 103. Thus, the NUC corrects non-uniformities among pixels 111 in FPA 103.

3. Non-Uniformity Correction Method for Imaging Sensors.

Figure 3A:
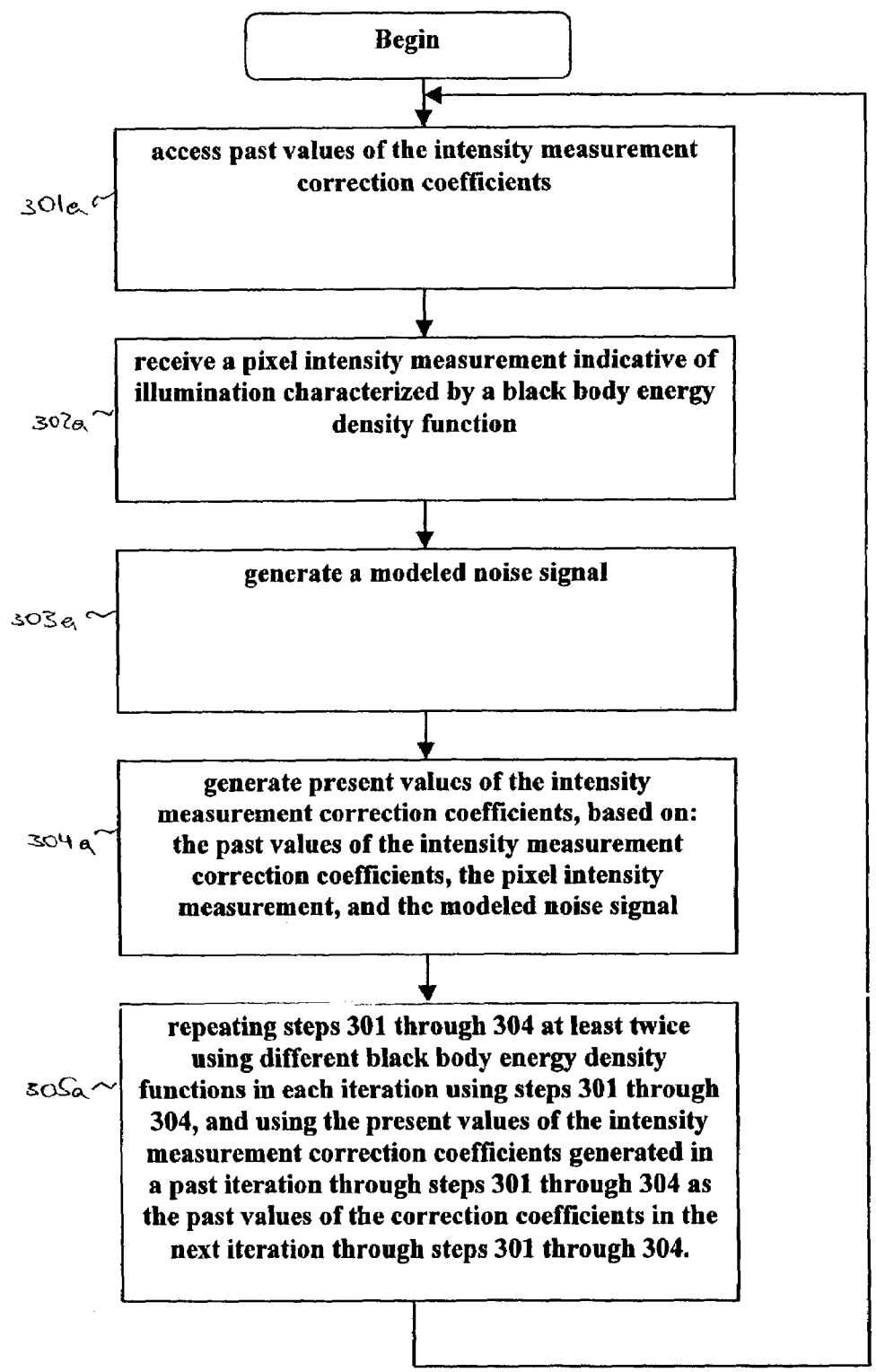
FIG. 3a is a flow chart diagram illustrating an example method for generating non-uniformity correction coefficients.

FIG. 3a illustrates an example method 300 for determining NUC coefficients, e.g., gain and offset coefficients, for a pixel of FPA 103 in imaging system 100. Method 300 is performed during a calibration cycle of system 100. The NUC coefficients are used to correct an intensity measurement made by the given pixel during a subsequent scene illumination cycle. Method 300 is also referred to herein as a calibration algorithm.

In step 301a, NUC processor 125 accesses past values of the NUC coefficients for the given pixel. Past values of the NUC coefficients serve as input values to generate present values of the NUC coefficients in subsequent step 304a, as will be described below. In a first pass through method 300, the past values are initial predetermined values. In subsequent passes through method 300, for example, during a steady state operation of system 100, the past values represent refined values of the NUC coefficients, as will become apparent from the ensuing description.

In a next step 302a, imaging system 100 directs reference illumination 109 to FPA 103, and thus, to the given pixel. The given pixel generates a pixel intensity measurement responsive to the reference illumination. NUC processor 125 receives pixel intensity measurement indicative of the reference illumination characterized by the calibrated energy density function, such as a first black body energy density function, $N_1(\lambda, T)$, defined by formula (2) above. The black body energy density function, $N_1(\lambda, T)$, represents calibrated illumination. The processing then proceeds to step 303a. The difference between pixel intensity and the energy density function $N_1(\lambda, T)$ is an input to the coefficient correction computation.

In step 303a, NUC processor 125 generates a modeled noise signal. The modeled noise signal is another input value used for weighting purposes in calculation of present values of the NUC coefficients, and will be described below in more detail. The processing then proceeds to step 304a.

In step 304a, NUC processor 125 generates present values of the NUC coefficients based on the past values of the NUC coefficients (accessed in step 301a), the pixel intensity measurement (generated in step 302a), and the modeled noise signal (generated in step 303a). Step 304a uses Kalman filter processing based on the above described inputs, to generate the NUC coefficients. The generated present values of the NUC coefficients are forwarded to steps 305a and 301a.

In step 305a, NUC processor 125 repeats steps 301a through 304a at least twice using two different black body energy density functions $N_2(\lambda, T)$ and $N_3(\lambda, T)$, in each iteration through steps 301a through 304a and using the present values of NUC coefficients generated in the past iteration as the past values of the NUC coefficients in the next iteration through steps 301a through 304a. Exemplary black body energy density functions $N_1(\lambda, T)$, $N_2(\lambda, T)$, and $N_3(\lambda, T)$ may correspond to respective temperatures 280 K, 300 K, and 320 K, as described above.

After step 305a, method 300 repeats steps 301a through 305a for other pixels in FPA 103. In other words, method 300 obtains the NUC coefficients for every pixel 111 in FPA 103. The resulting NUC coefficients are used to correct all pixels 111 in order to provide a uniform response over FPA 103 during a subsequent scene illumination cycle.

Figure 3B:
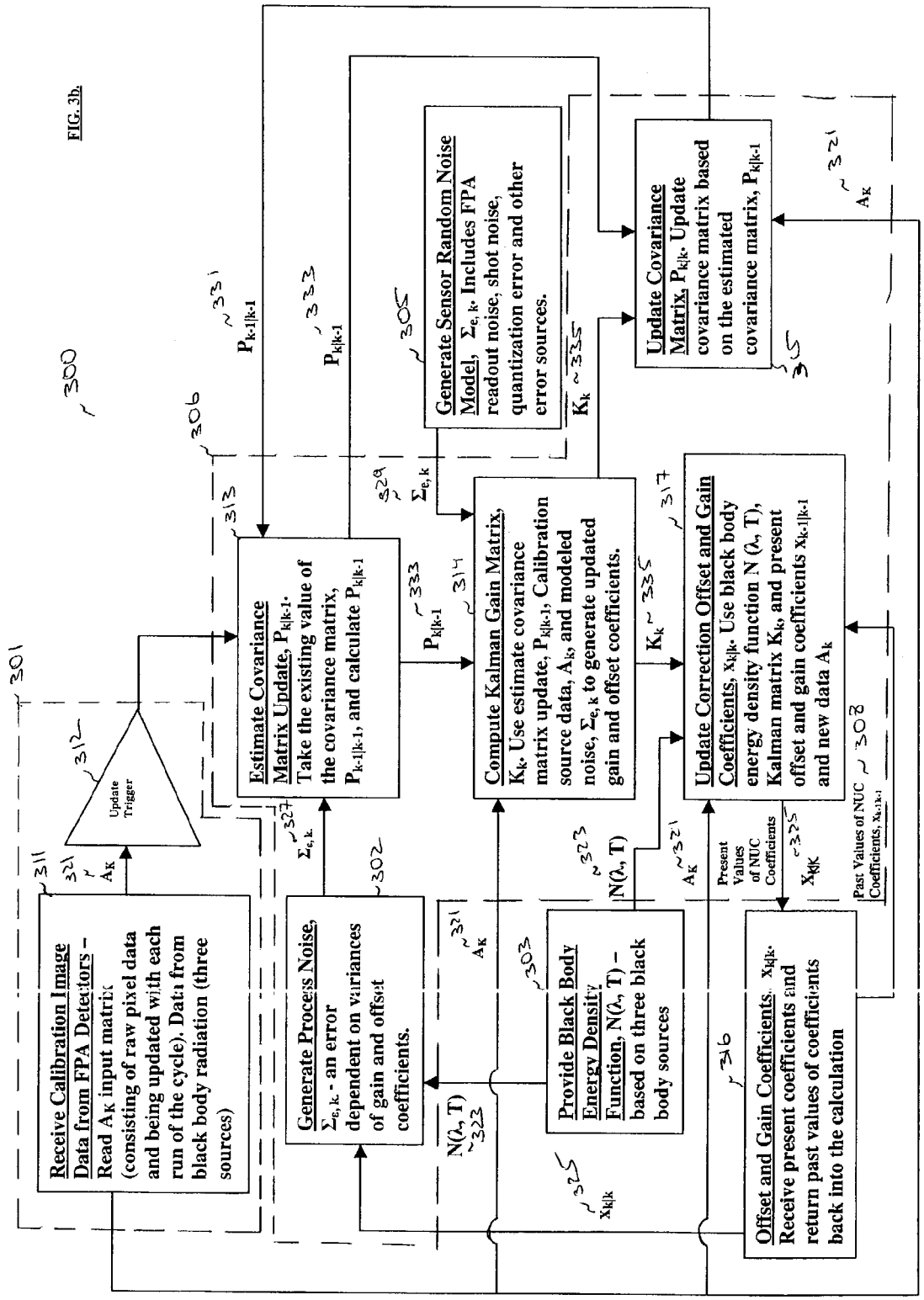

FIG. 3b is a more detailed flow chart diagram of an arrangement of method 300. An initial step 301 triggers method 300 to begin generation and calibration of NUC coefficients (indicated at 325 in FIG. 3b) for a given pixel in FPA 103. Functions performed by NUC processor 125 in step 301 of FIG. 3b are included in step 302a of FIG. 3a. As part of step 301, NUC processor 125 receives a pixel intensity measurement indicative of illumination characterized by a black body energy density function $N(\lambda, T)$ (also referred to as calibration image data, as described above).

Step 301 includes the further following steps:

a step 311 for receiving calibration image data from the pixel; and a step 312 for triggering method 300.

In step 311, after receiving calibration image data from the pixel, the calibration image data is placed in a form of an input matrix, $A_k$, 321. The measurement input matrix can be expressed as a matrix, $A_k$, 321, as follows:

$$A_k = [R1] \quad (3)$$

where R is referred to as a measured FPA 103 response to reference illumination 108 (i.e., pixel intensity measurement). Furthermore, the input matrix $A_k$ represents partial derivatives of a linear non-uniformity correction with respect to gain and offset coefficients, respectively.

After receiving input matrix, $A_k$, 321, method 300 proceeds to step 312. Step 312 serves to trigger method 300 to calculate NUC coefficients by supplying input matrix, $A_k$, 321 to a step 313, described below.

After step 301 triggers method 300 in step 301, method 300 begins calculating NUC coefficients. As depicted in FIG. 3b, method 300 includes the following further steps:

a step 316 for accessing past values 308 of the NUC coefficients 325 (functions performed by NUC processor 125 in the combination of steps 301 and 316 of FIG. 3b, generally correspond to functions performed in step 301a of FIG. 3a);

a step 303 provides black body energy density function $N(\lambda, T)$ 323 (e.g., $N_1(\lambda, T)$, $N_2(\lambda, T)$, and $N_3(\lambda, T)$) to a step 306 (specifically, to steps 302 and 317 within step 306). $N(\lambda, T)$ 323 characterizes the calibrated illumination used in generating the pixel intensity measurement (in step 302a of FIG. 3a) received in step 301. Therefore, steps 301 and 303 together generally correspond to step 302a of FIG. 3a;

a step 305 for generating a modeled noise signal 329 (functions performed by NUC processor 125 in step 305 of FIG. 3b, generally correspond to functions performed in step 303a of FIG. 3a); and a step 306 for generating present values of NUC coefficients 325. Functions performed by NUC processor 125 in step 306 of FIG. 3b, generally correspond to functions performed by NUC processor 125 in step 304a of FIG. 3a.

Step 306 bases its calculation of NUC coefficients 325 on the past values 308 of NUC coefficients 325, a pixel intensity measurement (i.e., calibration image data) from the given pixel, modeled noise signal 329, and reference energy density function 323.

In step 305, NUC processor 125 generates a modeled noise signal such as a model noise signal variance, $\Sigma_{e,k}$, 329. The model noise signal variance 329 is computed as a sum of squares of values of random noise sources including FPA 103 readout noise ($\sigma_R$), shot noise ($\sigma_S$), quantization error ($\sigma_Q$), as well as other noise sources:

$$\Sigma_{e,k} = \sigma_R^2 + \sigma_S^2 + \sigma_Q^2 + \sigma_{OTHER}^2 \quad (4)$$

Each of the noise sources is defined as follows. The FPA readout noise ($\sigma_R$) is an electronic readout noise of FPA 103 amplifiers. FPA readout noise ($\sigma_R$) is modeled as one analog to digital unit (ADU) of random error (which can vary depending on the electronic implementation), as follows:

$$\sigma_R = 1 \, [ADU] \quad (5)$$

The shot noise $\sigma_S$ is a function of a fraction of saturation $f_{SAT}$ of FPA 103 the FPA 103 capacity $Q_{WELL}$, and the process gain $G_{PROCESS}$.

$$\sigma_S = \frac{f_{SAT} * \sqrt{Q_{WELL}}}{G_{PROCESS}} [ADU] \quad (6)$$

The FPA fraction of saturation $f_{SAT}$ is the ratio of the FPA's electron count $e^-$ to its well capacity. The process gain is computed from the FPA's well capacity and the analog-to-digital (A/D) number of quantization levels, n, (in an embodiment, n=14):

$$G_{PROCESS} = \frac{Q_{WELL}}{2^n} [e^-/ADU] \quad (7)$$

The quantization error ($\sigma_Q$), also referred to as digitization error, is modeled as a square root of one twelfth of one least significant bit (LSB) of the A/D number of quantization levels, n. In this case, one LSB is equal to one ADU:

$$\sigma_Q = \frac{1}{\sqrt{12}} [ADU] \quad (8)$$

When generating model noise 329, other noise effects can be considered. These include non-linearity in detector response ($\sigma_L$), detector output drift (such as 1/f noise), black body calibration error ($\sigma_B$), special calibration error ($\sigma_\lambda$), and black body intensity variation over the pixel spectral range ($\sigma_\Lambda$). The total calibration model noise ($\sigma_{MODEL}$) is computed as a root of the sum of the squares of the above random noise sources, as shown above.

Method 300 is a regenerative process. In other words, method 300 uses past values 308 of NUC coefficients 325 as input values used in calculation of present values of NUC coefficients 325. Past values 308 of NNUC coefficients 325 are inputted from step 316.

In step 306, method 300 generates the present values of NUC coefficients, $X_{k|k}$, 325 using the following further steps:

a step 302 of generating a process noise, $\Sigma_{e,k}$, 327;

a step 313 of estimating a covariance matrix update, $P_{k|k-1}$, 333;

a step 314 of computing a Kalman gain matrix $K_k$, 335;

a step 315 of updating a covariance matrix, $P_{k-1|k-1}$, 331; and a step 317 of updating and generating present values of NUC coefficients, $x_{k|k}$, 325 for the pixel.

Step 313 uses as its input matrix, $A_k$, 321 (described above) and process noise, $\Sigma_{e,k}$, 327. The process noise, $\Sigma_{e,k}$, 327 is defined according to the following relationship:

$$\sum_{\varepsilon,k} = \begin{bmatrix} \sigma^2_{\varepsilon,GAIN} & 0 \\ 0 & \sigma^2_{\varepsilon,OFFSET} \end{bmatrix} \quad (9)$$

The process noise, $\Sigma_{e,k}$, 327 indicates variance of NUC coefficients 325 from measurement to measurement (i.e., between past values 308 and present values of NUC coefficients 325 for the pixel). This relationship presumes steady state values for these parameters with a relatively small potential drift. The following predetermined initial values can be used in the absence of the calibration image data (that is, pixel intensity measurement representing calibrated or reference illumination):

$$\sum_{\varepsilon,k} = \begin{bmatrix} 10^{-10} & 0 \\ 0 & 10^{-10} \end{bmatrix} \quad (10)$$

Since the gain coefficient has a varying influence on the NUC coefficients, its noise variance shall be adjusted dynamically to ensure a balance, as follows:

$$\sigma^2_{\varepsilon,GAIN} = \sigma^2_{\varepsilon,OFFSET} \cdot \frac{\text{gain}}{N(\lambda, T) - \text{offset}} \quad (11)$$

where "gain" is gain coefficient and "offset" is offset coefficient.

Large values for the process noise, $\Sigma_{e,k}$, 327 will tend to bias corrections of NUC coefficients 325, generated in step 317 (described below), towards the present values of NUC coefficients for the pixel. Smaller values of the process noise, $\Sigma_{e,k}$, 327 average current measurement differences out over a longer period of calibration of NUC coefficients 325 for the pixel.

Once process noise, $\Sigma_{e,k}$, 327 is calculated, it servers as an input to step 313. In step 313, method 300 estimates a next covariance state of the calibration algorithm 300 (i.e., the next state values of covariance of NUC coefficients 325 for the pixel) based on the previous state of the calibration algorithm 300 (i.e., the previous state values of covariance of NUC coefficients 325 for the pixel) and the process noise, $\Sigma_{e,k}$, 327, described above. In other words, estimate of covariance matrix update, $P_{k|k-1}$, 333 (indicative of estimation of a next state k based on the known values of a previous state k−1) is calculated as follows:

$$P_{k|k-1} = P_{k-1|k-1} + \Sigma_{e,k} \quad (12)$$

where $P_{k-1|k-1}$ 331 indicates known covariance values for NUC coefficients 325 for the pixel in the previous state k−1, and k=1, ..., n. Because $P_{k|k-1}$ 333 uses prior values of covariances of NUC coefficients 325, the initial value of covariance $P_{0|0}$ for NUC coefficients 325 is defined as follows:

$$P_{0|0} = \begin{bmatrix} 10^{10} & 0 \\ 0 & 10^{10} \end{bmatrix} \quad (13)$$

Thus, with each new state (or iteration) k, or estimation cycle of calibration algorithm 300, $P_{0|0}$ gets adjusted based on the previous calculation of covariance at state k−1 using equation (12). As can be seen from equations (9)–(13), $P_{k|k-1}$, 333 is a 2×2 matrix.

After estimating covariance update matrix, $P_{k|k-1}$, 333 in step 313, method 300 proceeds to computing Kalman gain matrix, $K_k$, 335 in step 314. To compute Kalman gain matrix $K_k$ 335, method 300 combines calibration image data in the form of input matrix, $A_k$, 321 generated in step 311, estimated covariance matrix update, $P_{k|k-1}$, 333 generated in step 313, and sensor random noise model, $\Sigma_{e,k}$, 329, generated in step 305. Kalman gain matrix, $K_k$, 335 is calculated based on the following relationship:

$$K_k = P_{k|k-1} \cdot A_K^T \cdot [A_K \cdot P_{K|K-1} \cdot A_K^T + \Sigma_{e,K}]^{-1} \quad (14)$$

where Kalman gain matrix, $K_k$, 335 specifies the weight of the current calibration image data in updating NUC coefficients 325 for the pixel. The gain matrix, $K_k$, 335 is a 2×1 matrix. In other words, Kalman gain matrix, $K_k$, 335 is a weighting factor in calculating the next state, k, values of NUC coefficients 325 for the pixel. Kalman gain matrix, $K_k$, 335 adjusts the next state NUC coefficients 325 by approximating the NUC coefficients 325, as will be described below. Note that the bracketed portion in formula (14) of Kalman gain matrix, $K_k$, 335 is a scalar, making the matrix inversion simply the reciprocal of the scalar.

The Kalman gain matrix, $K_k$, 335 is then used to update the covariance matrix, $P_{k|k}$, 331 in step 315 and calculate present values of NUC coefficients 325 in step 317.

Step 315 uses calibration data in the form of input matrix, $A_k$, 321 and previously calculated estimate of covariance matrix update, $P_{k|k-1}$, 333 to update covariance matrix, $P_{k|k}$, 331. $P_{k|k}$, 331 is used to calculate the next state Kalman gain matrix, $K_{k+1}$, 335. The update to covariance matrix, $P_{k|k}$, 331 is calculated according to the following relationship:

$$P_{K|K} = [I - K_K \cdot A_K] \cdot P_{K|K-1} \quad (15)$$

where I is a 2×2 identity matrix. Because, components of equation (15) include values relating to gain variances and offset variances of the pixel intensity measurement, the covariance matrix update, $P_{k|k}$, 331 can be expressed as follows:

$$P_{K|K} = \begin{bmatrix} \sigma^2_{GAIN} & \sigma_{GAIN,OFFSET} \\ \sigma_{GAIN,OFFSET} & \sigma^2_{OFFSET} \end{bmatrix} \quad (16)$$

Where:

$\sigma^2_{GAIN}$ and $\sigma^2_{OFFSET}$ indicate variances of respective gain and offset NUC coefficients 325 for the pixel; and $\sigma_{GAIN, OFFSET}$ indicates covariance between gain and offset.

The Kalman gain matrix, $K_k$, 335 derived in step 314 is also used in derivation of present values of NUC coefficients, $x_{k|k}$, 325 in step 317. To calculate NUC coefficients, $x_{k|k}$, 325, calibration algorithm 300 uses black body energy density function, $N(\lambda, T)$, (e.g., $N_1(\lambda, T)$, $N_2(\lambda, T)$, and $N_3(\lambda, T)$) 323, past values, $x_{k-1|k-1}$, 308 of NUC coefficients 325, the Kalman gain matrix, $K_k$, 335 and input matrix, $A_k$, 321. Therefore, the present values of correction coefficients, $x_{k|k}$, 325 (or next state NUC coefficients 325) for the pixel are calculated based on the following relationship:

$$\hat{x}_{K|K} = \hat{x}_{K-1|K-1} + K_K \cdot [N(\lambda,T) - A_K \cdot \hat{x}_{K-1|K-1}] \quad (17)$$

where the present values of NUC coefficients, $x_{k|k}$, 325 for the pixel are a function of the Kalman gain matrix, $K_k$, 335 and the difference between the black body energy density function, $N[\lambda, T]$, 323 and input matrix $A_k$ 321 (representing calibration image data indicative of illumination from calibrated black body source 106) as corrected by past values 308 of NUC coefficients, $x_{k-1|k-1}$, 325. Because the calibration algorithm is a regenerative process, it uses past values 308 of NUC coefficients 325, therefore, in the first state (k=1) NUC coefficients are set to predetermined initial values, as follows:

$$x_{0|0} = \begin{bmatrix} gain \\ offset \end{bmatrix} = \begin{bmatrix} 0 \\ 0 \end{bmatrix} \quad (18)$$

As would be understood by one having ordinary skill in the art, other values of initial NUC coefficients 325 are possible.

Once method 300 calculates present values of NUC coefficients, $x_{k|k}$, 325 for the pixel, it stores the present values of NUC coefficients 325 (step 316). Present values of NUC coefficients 325 become past values 308 of correction coefficients 325 for the pixel in the next cycle of calculation of correction coefficients 325, because calibration algorithm 300 is a recursive process. Furthermore, the present values of NUC coefficients 325 calculated in the first cycle of method 300, are used to trigger calculation of present values of NUC coefficients 325 in the second cycle of method 300.

The above description of calibration algorithm 300 was given for a single pixel in FPA 103. However, method 300 is repeated for each of the pixels 111 in focal plane array 103, as shown in FIG. 3a. Therefore, for each of the pixels 111 in FPA 103, calibration algorithm calculates a set of NUC coefficients 325, i.e., offset and gain. The multiple sets of NUC coefficients collectively represent NUC coefficients 215 in FIG. 2a. Furthermore, each set of NUC coefficients 325 are continuously updated during calibration algorithm 300. Such continuous update improves over time the NUC coefficients 325 that will be used to correct raw pixel intensity measurement, $I_{read}$, during the scene measurement cycles to correct scene image data (as described above).

Figure 4A:
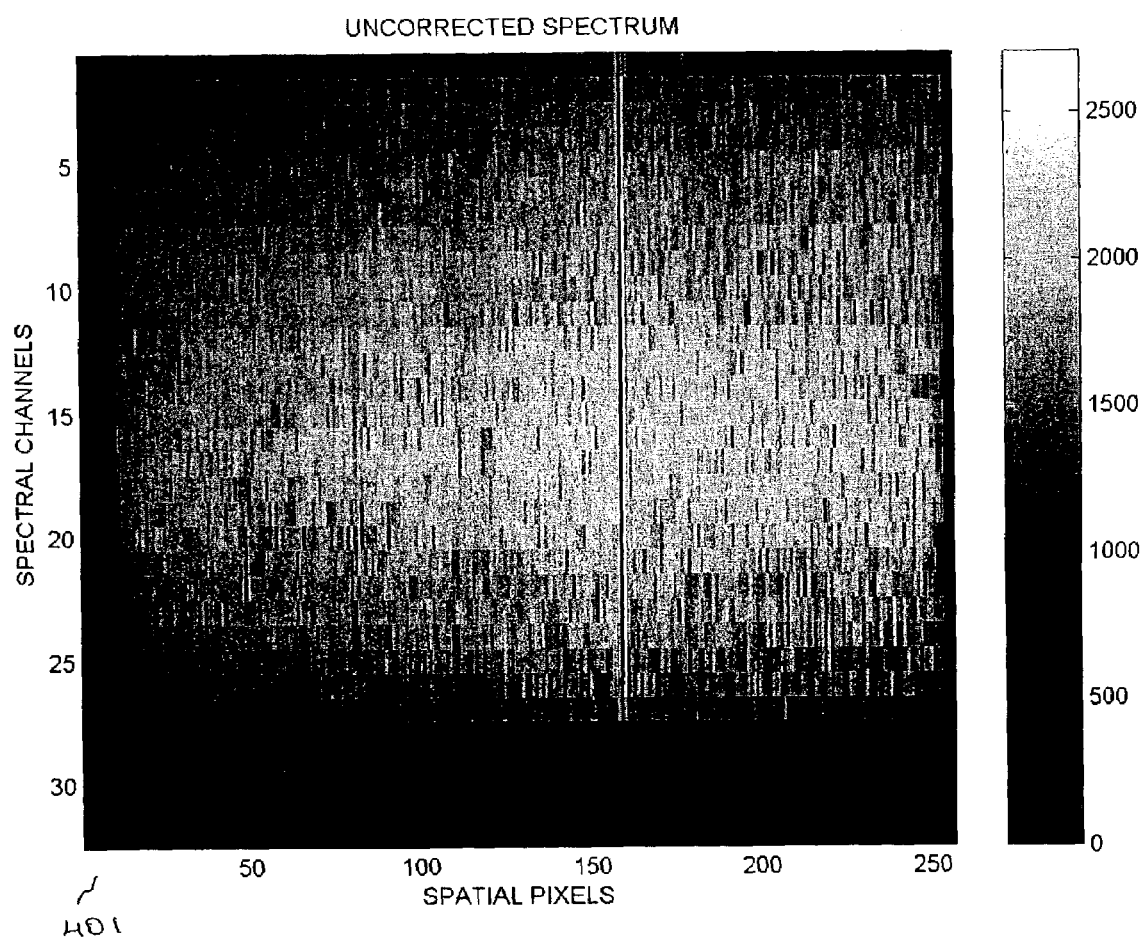
FIG. 4a illustrates an uncorrected spectrum produced by an FPA responsive to an illumination source.
Figure 4B:
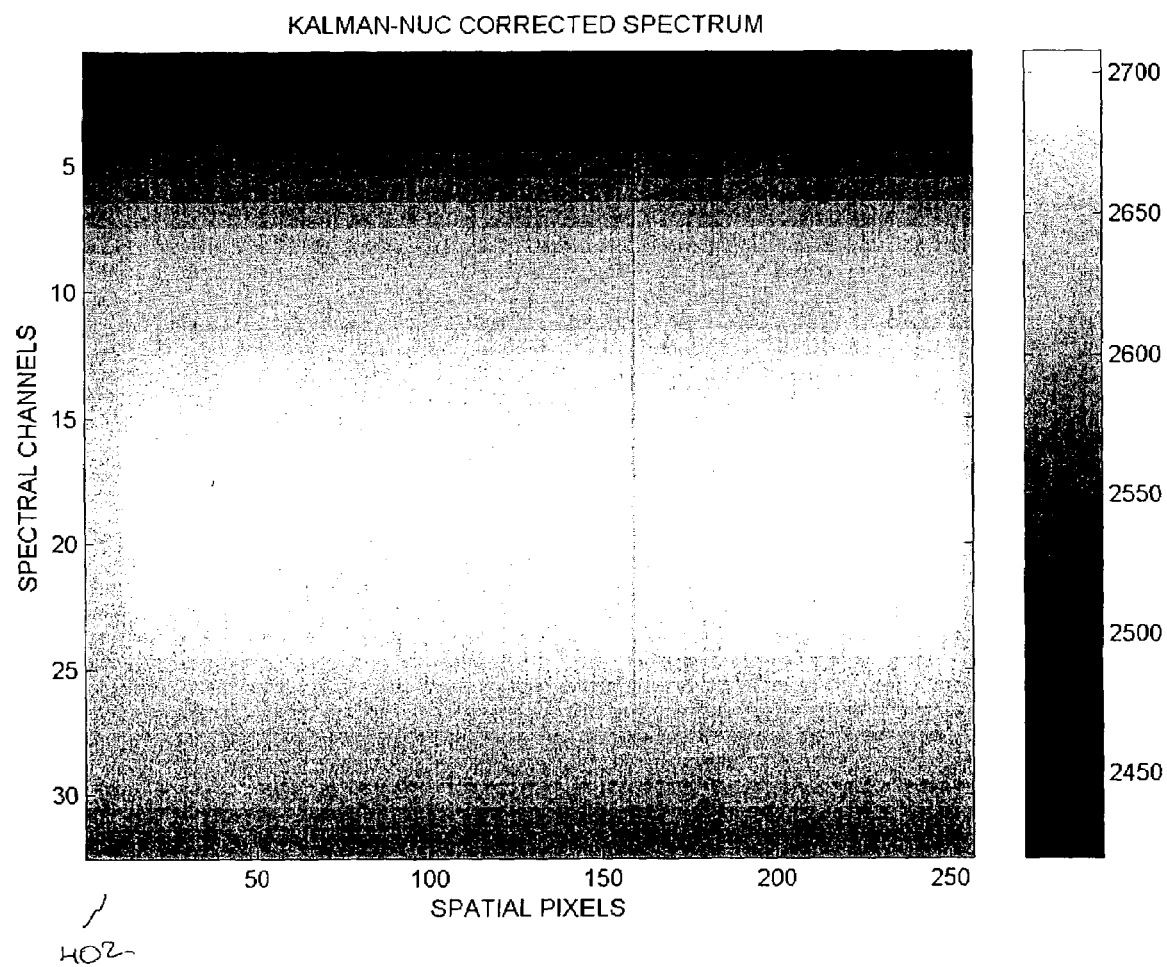
FIG. 4b illustrates a corrected spectrum produced by the FPA of FIG. 4a using systems and methods of the present invention.

During the scene measurement cycle (after completion of calibration algorithm 300), NUC coefficients 325 are applied to correct raw pixel intensity measurement 115S for each of pixels 111 in FPA 103, according to equation (1) above. Because each of pixels 111 in FPA 103 has an individual set of NUC coefficients 325, raw pixel intensity measurement for each of pixels 111 is corrected using respective NUC coefficients 325 and equation (1). Therefore, such correction generates an array of uniformly corrected pixel outputs. FIG. 4a shows an uncorrected spectrum 401 of FPA 103 (shown in FIG. 2d). The uncorrected spectrum 401 includes "grainy" and non-uniform pixel intensities. FIG. 4b shows a corrected spectrum 402 of FPA 103 using calibration algorithm 300 described above. The spectrum 402 has relatively uniform corrected pixel intensities and relatively few distortions as compared to uncorrected spectrum 401.

The method does not depend on the initial NUC coefficients, i.e., the method can calculate NUC coefficients using any of initial conditions. It can be applied to different types of focal plane detectors as well as different spectral bands such as x-ray, ultra-violet, visible, infrared spectral bands and others.

4. Non-Uniformity Correction Processor for Imaging Sensors.

Figure 5:
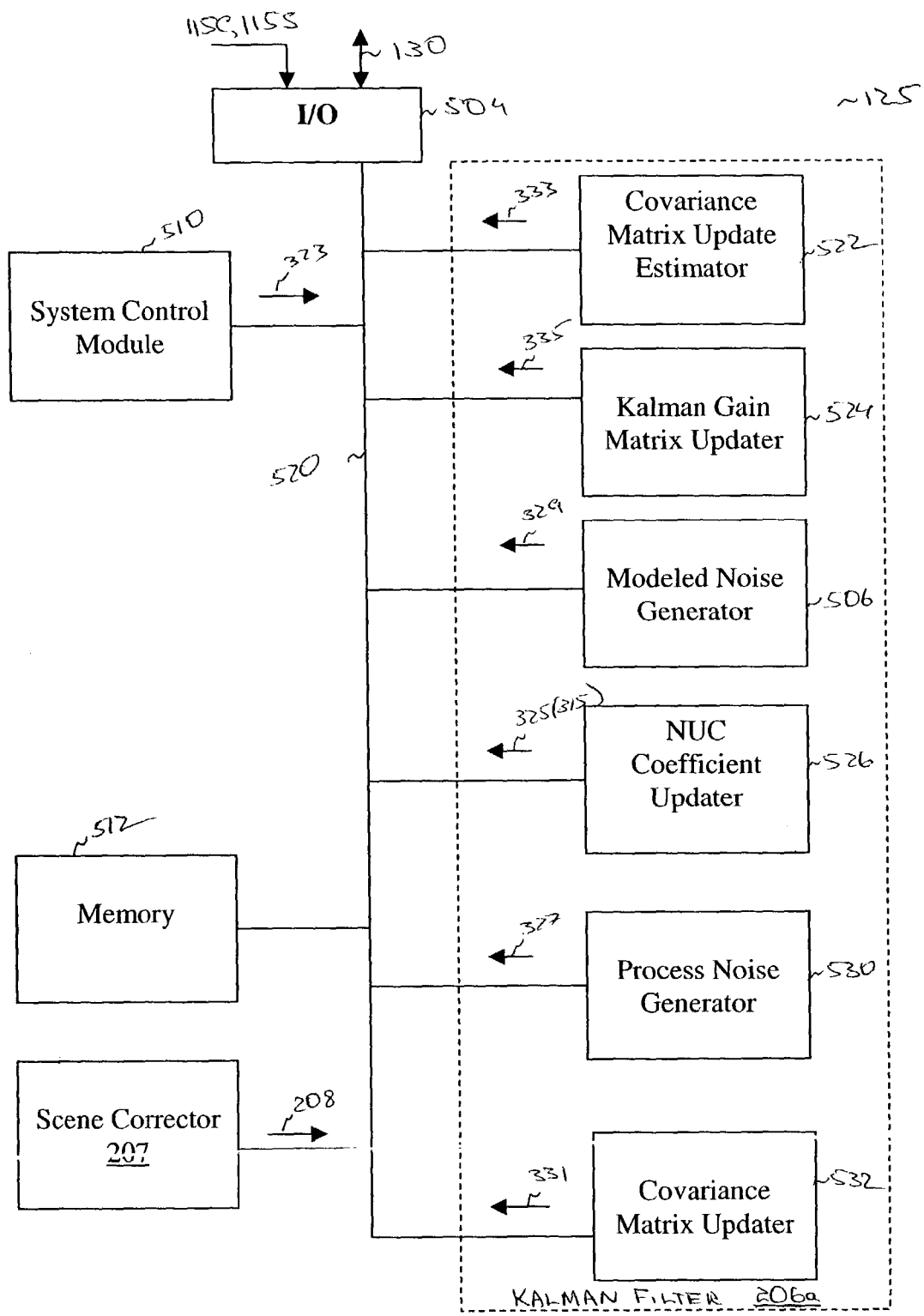
FIG. 5 is a block diagram of an example arrangement of an NUC processor of FIG. 1 for performing one or more methods of the present invention.

FIG. 5 is a block diagram of an example arrangement of NUC processor 125 for performing one or more of the methods of the present invention. FIG. 5 expands on the block diagram of FIG. 2. NUC processor 125 includes an input/output (I/O) block or module coupled to control interface 130. Also, I/O module 504 receives pixel measurements 115C and 115S from FPA 103.

NUC processor 125 also includes Kalman filter 206a, scene corrector 207 for producing corrected image data 208, a system control module 510 for controlling the overall operation of system 100, and a memory 512 for storing information, all coupled to one another and I/O module 504 over or through a communication interface 520.

Kalman filter 206a operates in accordance with step 306 of method 300. Kalman filter 206a includes:

a covariance matrix update estimator 522 for generating signal 333 in accordance with step 313 of method 300;

a Kalman gain matrix updater that generates signal 335 in accordance with step 214;

an NUC coefficient updater 526 that generates NUC coefficients 215 (e.g., 325 in FIG. 3b), in accordance with step 317;

a modeled noise generator 506 for generating modeled noise signal 329;

a process noise generator 530 that generates signal 327 in accordance with step 302; and a covariance matrix updater 532 that generates signal 331 in accordance with step 315.

In an alternative arrangement, modeled noise generator 506 is external to Kalman filter 206a.

System control module 510 may generate a reference (e.g., black body) energy density function, e.g., signal 323 in FIG. 3b, based on information received from reference illumination source 106 through control interface 130 and I/O module 504.

Memory 512 stores information and result, such as past and present NUC coefficients and information related to reference energy density functions, if necessary. Memory 512 may also store computer or software code used for implementing the methods of the present invention. All of the above listed modules/elements of NUC processor 125 may intercommunicate with one another and access and store information in memory 512 through communication interface 520.

5. Computer System.

System 100 can perform specific features of the present invention using receiver controllers, which in effect comprise a computer system. Although communication-specific hardware can be used to implement the present invention, the following description of a general purpose computer system is provided for completeness. The present invention is preferably implemented in software. Alternatively, the invention may be implemented using hardware, firmware, or a combination of hardware, software and/or firmware. Consequently, the invention may be implemented in a computer system or other processing system.

Figure 6:
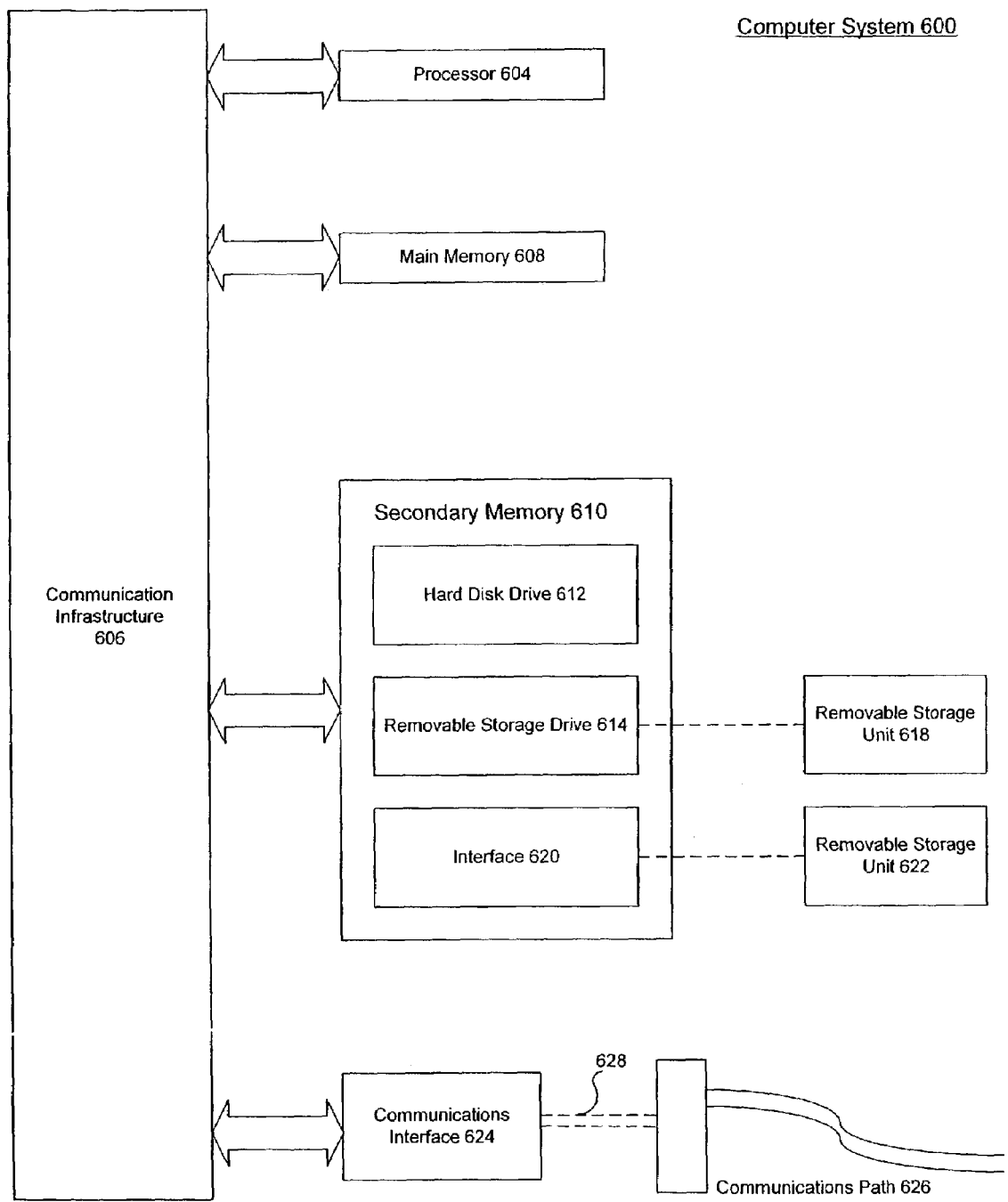
FIG. 6 is a block diagram of a general computer system in which methods of the present invention may be implemented.
Figure 1:
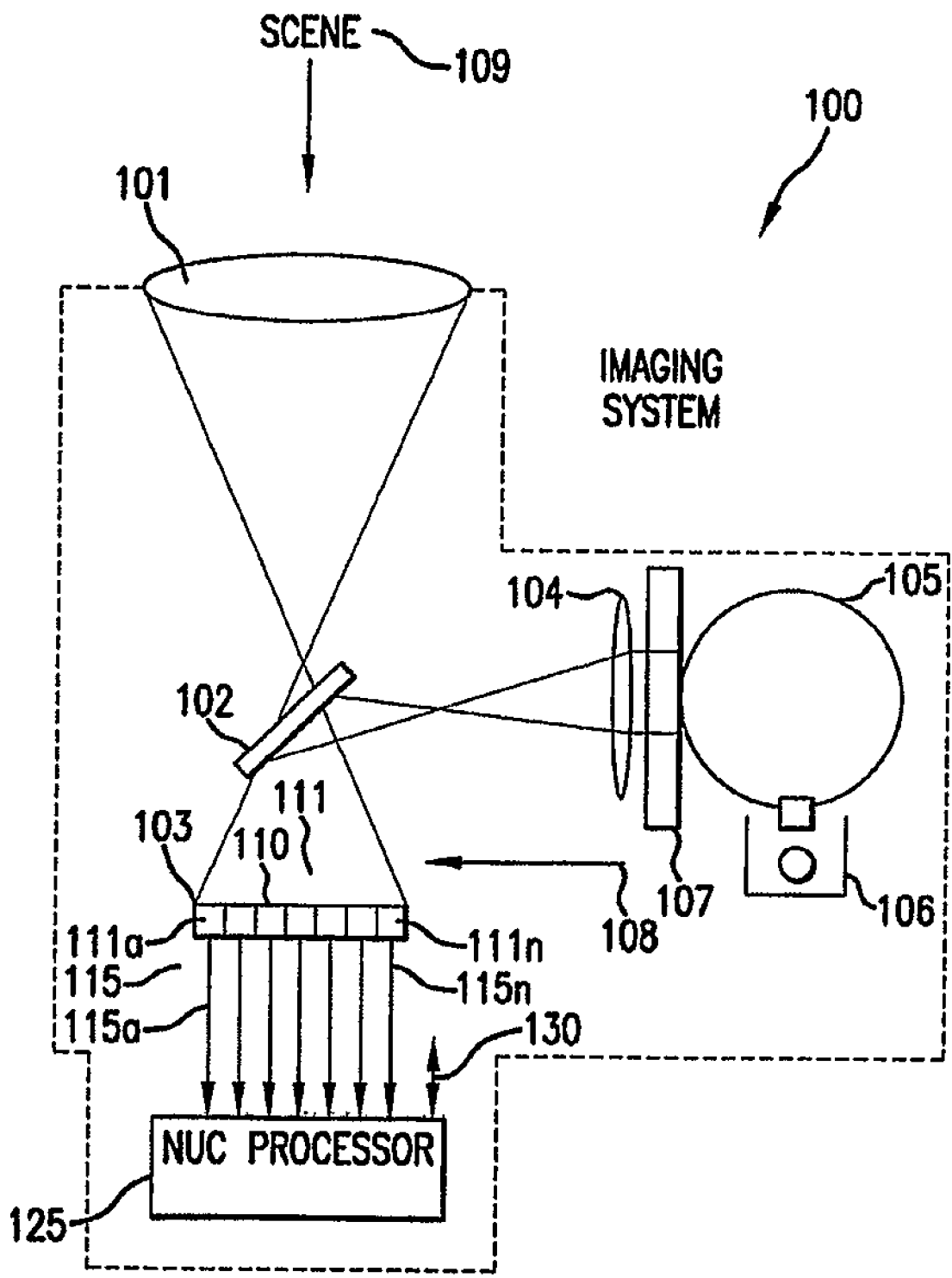
Figure 3B:
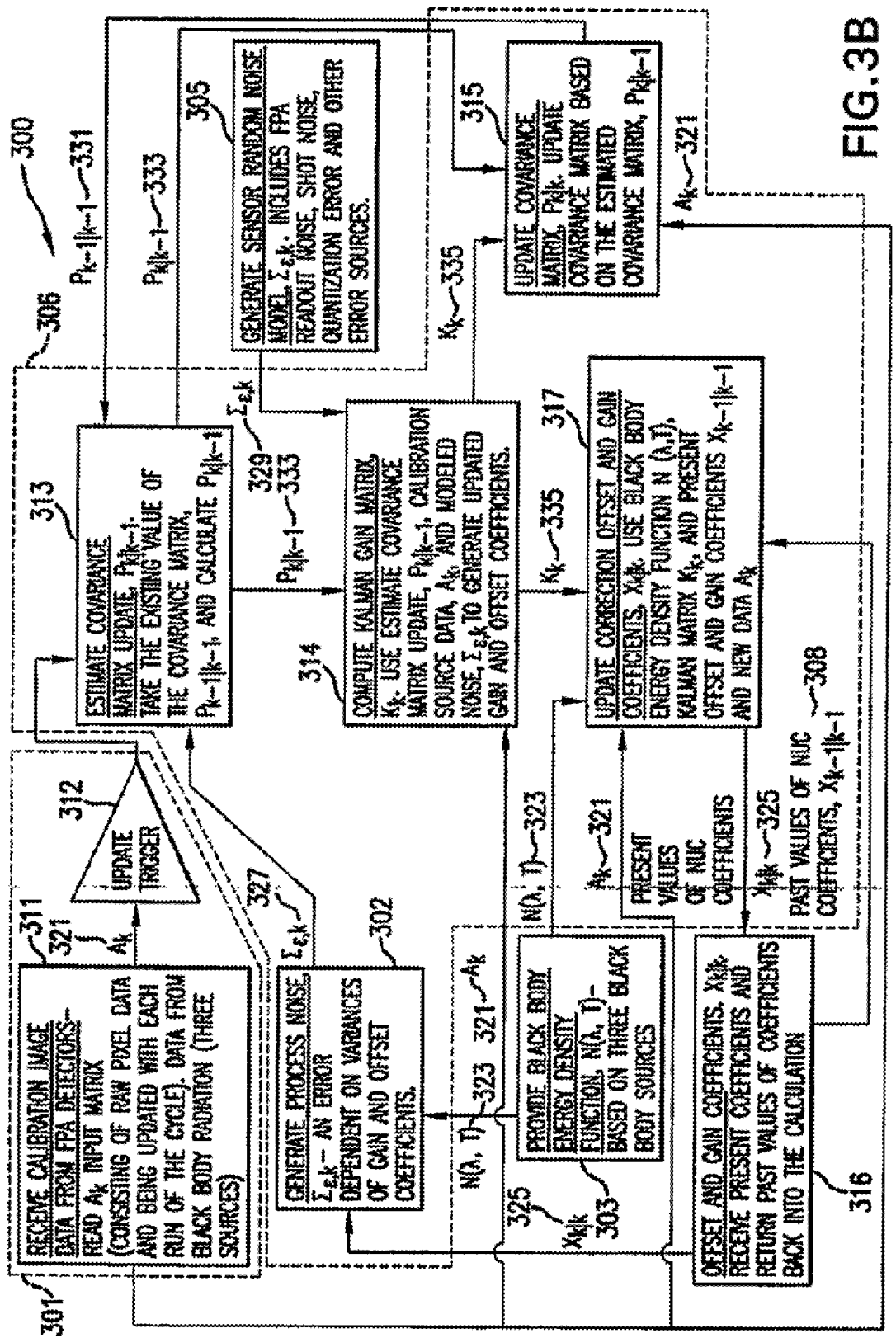
Figure 4A:
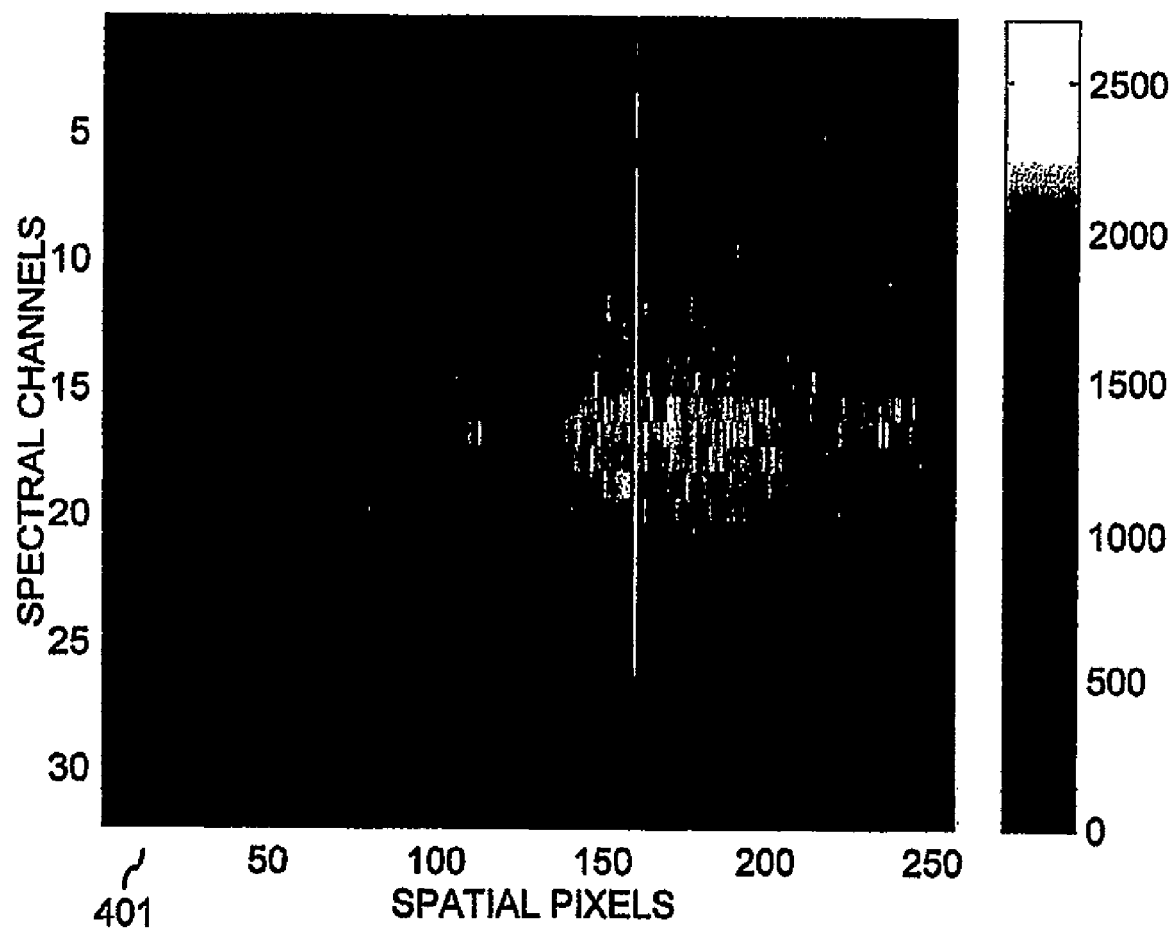
Figure 4B:
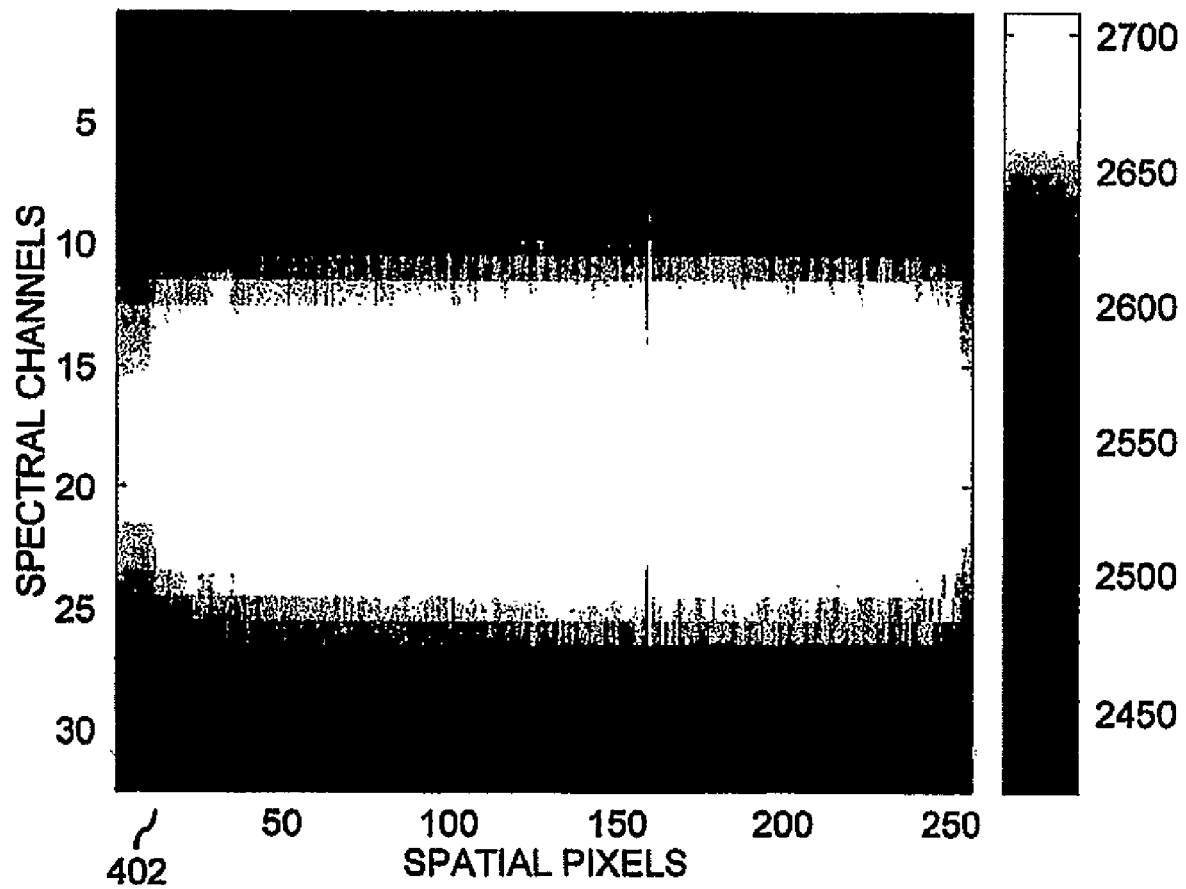
Figure 5:
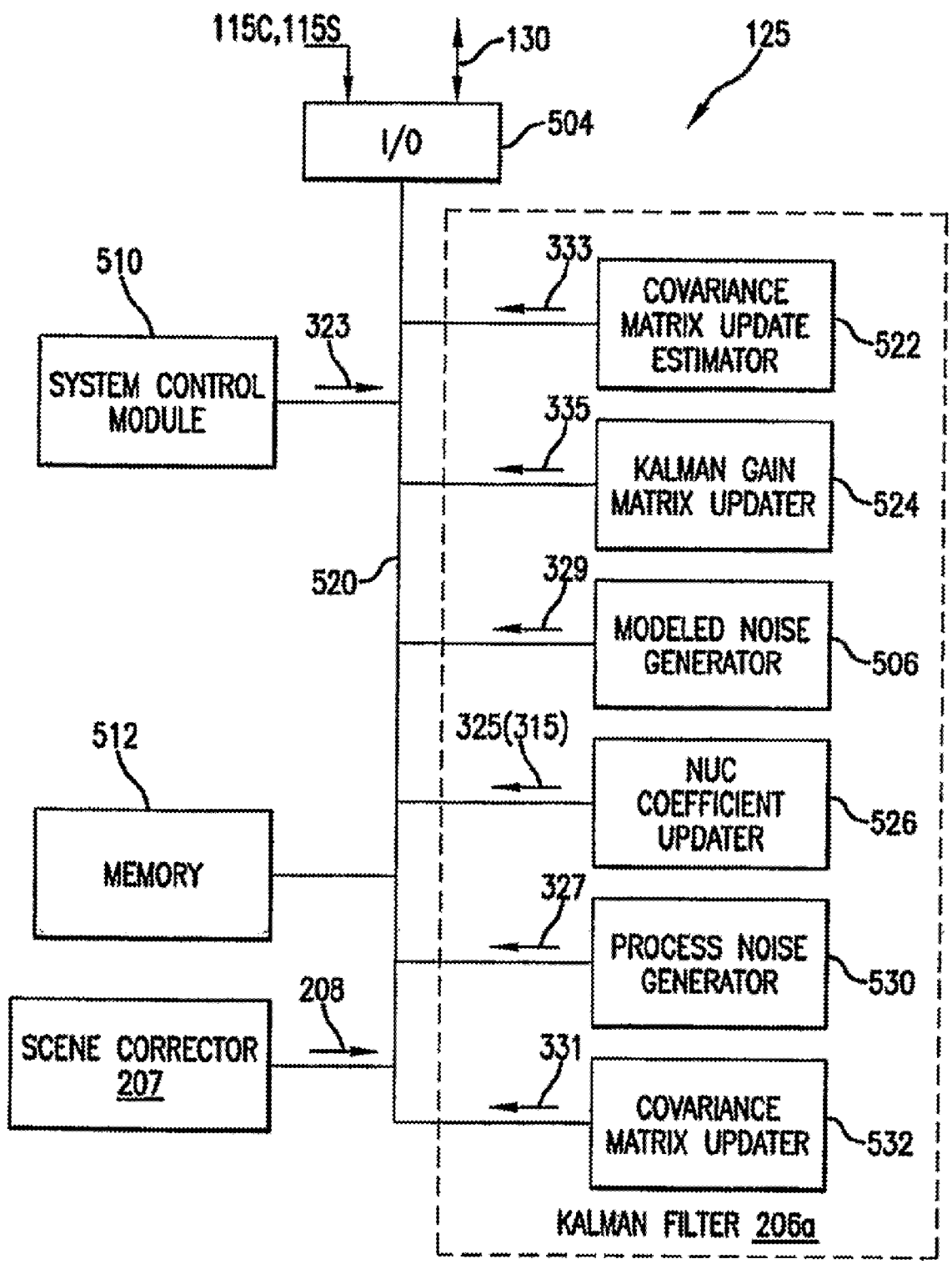
Figure 6:
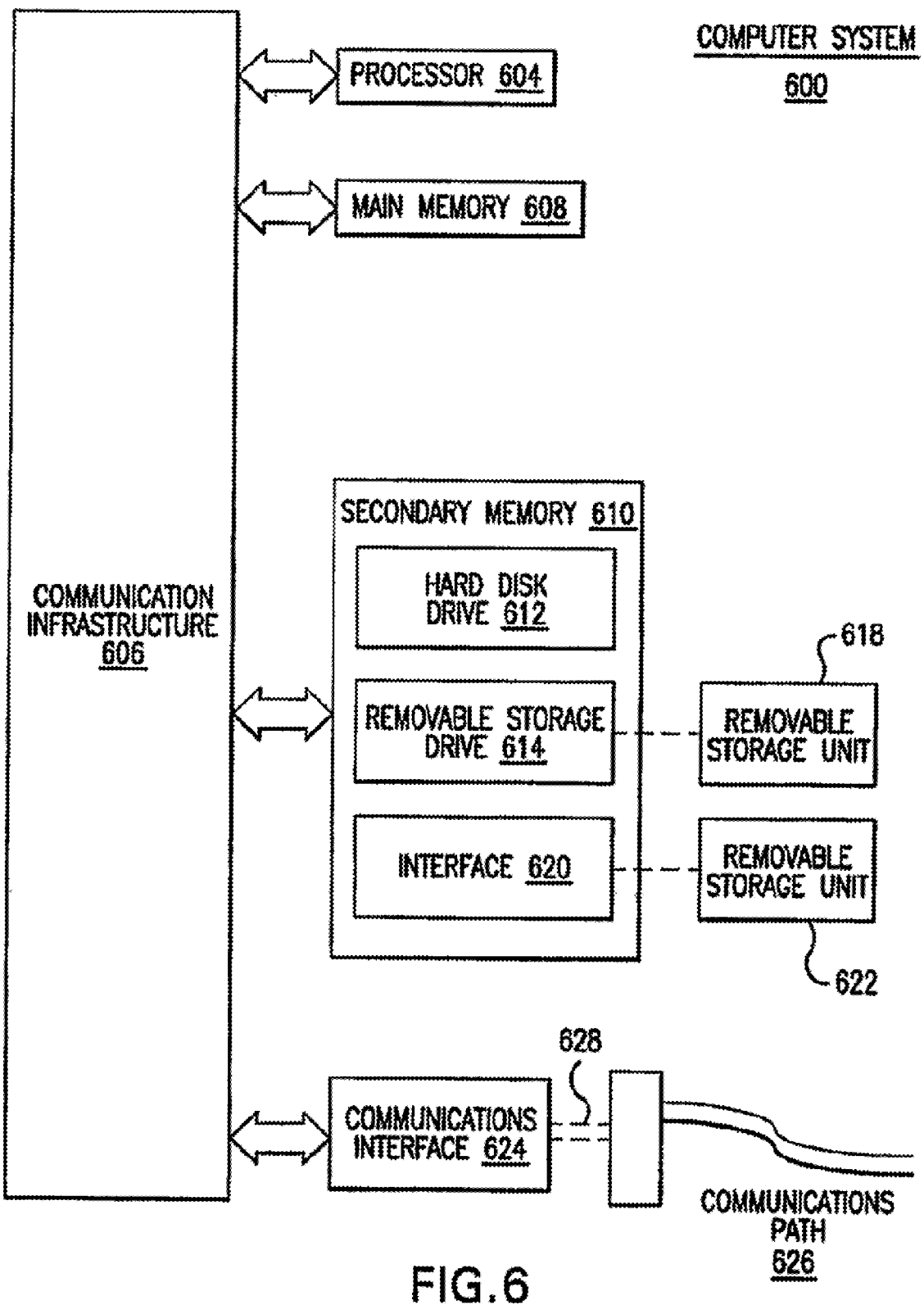

An example of such a computer system 600 is shown in FIG. 6. In the present invention, for example, the above described methods or processes execute on computer system 600. The computer system 600 includes one or more processors, such as processor 604, which may represent NUC processor 125. The processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 608, such as memory 512, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, non-volatile memory, and signals 628. These computer program products are means for providing software to computer system 600.

Computer programs (also called computer control logic) are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 604 to implement the process of the present invention, such as method 300 as depicted in FIGS. 3a and 3b. Accordingly, such computer programs represent controllers of the computer system 600. By way of example, in a preferred embodiment of the invention, the processes performed by NUC processor 125 can be performed by computer control logic. Where the invention is implemented using software, the software may be stored in a computer program product and loaded into computer system 600 using removable storage drive 614, hard drive 612 or communications interface 624.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

6. Conclusion

Example embodiments of the methods, circuits, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A method of generating intensity measurement correction coefficients for a pixel in a focal plane array of an optical sensor, comprising the steps of:
   (a) accessing past values of the correction coefficients;
   (b) receiving a pixel intensity measurement from the pixel indicative of illumination characterized by a reference energy density function;
   (c) generating a modeled noise signal; and
   (d) generating present values of the correction coefficients, as a function of
      the past values of the correction coefficients,
      the pixel intensity measurement,
      the modeled noise signal, and
      the reference energy density function.

2. The method of claim 1, wherein the past values of the correction coefficients are initial predetermined values.

3. The method of claim 1, wherein the step (c) comprises generating the at least one noise signal as a modeled noise signal in accordance with a sensor random noise model, the sensor random noise model including at least one of shot noise, detector drift, quantization error noise, focal plane readout noise, and random noise.

4. The method of claim 1, wherein the correction coefficients include a gain coefficient (G) and an offset coefficient (O).

5. The method of claim 4, wherein the gain coefficient (G) and offset coefficient (O) are used to correct a pixel intensity measurement $I_{READ}$ generated by the pixel responsive to scene illumination, according to: $I_{READ}=(I_C-O)/G$, where $I_C$ represents a corrected pixel intensity measurement.

6. The method of claim 1, further comprising
   (e) repeating steps (a) through (d) at least twice
       using different reference energy density functions in each iteration using steps (a) through (d), and
       using present values of the correction coefficients generated in a past iteration through steps (a) through (d) as the past values of the correction coefficients in the next iteration through steps (a) through (d).

7. The method of claim 6, further comprising:
   (f) repeating steps (a) through (e) for at least another pixel.

8. The method of claim 1, wherein step (d) comprises generating the present values of the correction coefficients using a Kalman filter process.

9. The method of claim 8, wherein the Kalman filter process of step (d) comprises:
   (d)(i) generating a process noise signal representative of variances of the correction coefficients; and
   (d)(ii) estimating a covariance matrix update for an update covariance matrix for the correction coefficients, based on
       (1) the process noise signal, and
       (2) a past value of the update covariance matrix.

10. The method of claim 9, wherein step (d)(i) comprises generating the process noise signal based on
    (1) the past values of the correction coefficients, and
    (2) the reference energy density function.

11. The method of claim 9, wherein the Kalman filter process of step (d) further comprises:
    (d)(iii) computing a Kalman gain matrix for the correction coefficients, as a function of
        (1) the estimated covariance matrix update,
        (2) the pixel intensity measurement, and
        (3) the modeled noise signal.

12. The method of claim 11, wherein the Kalman filter process of step (d) further comprises:
    (d)(iv) generating the present values of the correction coefficients, based on
        (1) the Kalman gain matrix,
        (2) the past values of the correction coefficients,
        (3) the pixel intensity measurement, and
        (4) the reference energy density function.

13. The method of claim 12, wherein the Kalman filter process of step (d) further comprises:
    (d)(v) generating an updated covariance matrix based on
        (1) the Kalman gain matrix,
        (2) the pixel intensity measurement, and
        (3) the estimated covariance matrix update.

14. The method of claim 13, wherein the reference energy density function is a black body energy density function.

15. A system configured to generate intensity measurement correction coefficients for a pixel in a focal plane array of an optical sensor, the pixel being configured to generate a pixel intensity measurement in response to reference illumination characterized by a reference energy density function, comprising:
    a memory for storing past values of the correction coefficients;
    a modeled noise generator for generating a modeled noise signal; and
    a Kalman filter for generating present values of the correction coefficients, based on
        the past values of the correction coefficients,
        the pixel intensity measurement,
        the modeled noise signal, and
        the reference energy density function.

16. The system of claim 15, wherein the past values of the correction coefficients are initial predetermined values.

17. The system of claim 15, wherein the modeled noise generator is configured to generate the modeled noise signal in accordance with a sensor random noise model, the sensor random noise model including at least one of shot noise, quantization error noise, focal plane readout noise, and random noise.

18. The system of claim 15, wherein the correction coefficients include a gain coefficient (G) and an offset coefficient (O).

19. The system of claim 18, further comprising a scene corrector, wherein the scene corrector uses the gain coefficient (G) and offset coefficient (O) to generate a corrected pixel intensity measurement ($I_C$) from a pixel intensity measurement $I_{READ}$ according to: $I_{READ}=(I_C-O)/G$.

20. The system of claim 15, wherein the Kalman filter uses a Kalman filter process to generate the present values of the correction coefficients.

21. The system of claim 20, wherein the Kalman filter further comprises:
    a process noise generator for generating a process noise signal representative of variances of the correction coefficients;
    a covariance matrix updater for generating an update covariance matrix of the correction coefficients; and
    a covariance matrix update estimator for estimating a covariance matrix update for an update covariance matrix of the correction coefficients, based on
        the process noise signal, and
        a past value of the update covariance matrix.

22. The system of claim 21, wherein the process noise generator generates the process noise signal based on
    the past values of the correction coefficients, and
    the reference energy density function.

23. The system of claim 21, wherein the Kalman filter further comprises:
    a Kalman gain matrix updater for computing a Kalman gain matrix for the correction coefficients, based on
        the estimated covariance matrix update,
        the pixel intensity measurement, and
        the modeled noise signal, wherein the modeled noise signal is generated by the modeled noise generator.

24. The system of claim 23, wherein the Kalman filter is configured to generate the present values of the correction coefficients, based on
    the Kalman gain matrix,
    the past values of the correction coefficients,
    the pixel intensity measurement, and
    the reference energy density function.

25. The system of claim 24, wherein the Kalman filter is configured to generate an updated covariance matrix based on
    the Kalman gain matrix,
    the pixel intensity measurement, and
    the estimated covariance matrix update.

26. The system of claim 15, wherein the reference energy density function is a black body energy density function.

* * * * *

UNITED STATES PATENT AND TRADEMARK OFFICE
CERTIFICATE OF CORRECTION

PATENT NO. : 7,230,741 B2
APPLICATION NO. : 10/340594
DATED : June 12, 2007
INVENTOR(S) : Ernandes et al.

It is certified that error appears in the above-identified patent and that said Letters Patent is hereby corrected as shown below:

Figures
Figures 1, 3A-3B, 4A-4B, 5, 6 should be replaced with the attached formal drawings filed June 16, 2003.

Column 14
Line 66 please delete "at least one".

Signed and Sealed this

Twenty-eighth Day of August, 2007

JON W. DUDAS
*Director of the United States Patent and Trademark Office*